US010931721B2

(12) United States Patent
Chauhan et al.

(10) Patent No.: US 10,931,721 B2
(45) Date of Patent: Feb. 23, 2021

(54) USER ACCOUNT-BASED ACCESS TO REAL-TIME COMMUNICATIONS

(71) Applicant: T-Mobile USA, Inc., Bellevue, WA (US)

(72) Inventors: Kanakrai Gajendra Chauhan, Bellevue, WA (US); Omar Hassan, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 196 days.

(21) Appl. No.: 14/574,001

(22) Filed: Dec. 17, 2014

(65) Prior Publication Data

US 2015/0188843 A1 Jul. 2, 2015

Related U.S. Application Data

(60) Provisional application No. 61/921,215, filed on Dec. 27, 2013.

(51) Int. Cl.
*H04L 29/06* (2006.01)
*H04L 29/08* (2006.01)
(Continued)

(52) U.S. Cl.
CPC ........ *H04L 65/1016* (2013.01); *H04L 47/801* (2013.01); *H04L 67/02* (2013.01);
(Continued)

(58) Field of Classification Search
CPC ... H04L 47/801; H04L 61/1547; H04L 67/02; H04W 12/06; H04W 12/08; H04W 48/08
See application file for complete search history.

(56) References Cited

U.S. PATENT DOCUMENTS 6,317,777 B1 11/2001 Skarbo et al.
7,124,302 B2 10/2006 Ginter et al.
(Continued)

FOREIGN PATENT DOCUMENTS

WO WO2007010541 1/2007
WO WO2013184347 12/2013

OTHER PUBLICATIONS

Office action for U.S. Appl. No. 14/488,979, dated Sep. 8, 2016, Chauhan et al., "Unified Communication Device", 15 pages.
(Continued)

*Primary Examiner* — Joe Chacko
(74) *Attorney, Agent, or Firm* — Lee & Hayes, P.C.

(57) ABSTRACT

Access to real-time communication services associated with real-time communication addresses may be provided based on a user account. A user logging in to a user account on one computing device may be provided with access to real-time communication services associated with a real-time communication address even when that real-time communication address is a real-time communication address for another device. Once logged in, the user may receive or initiate real-time communications for that real-time communication address at the computing device. The user may also add another real-time communication address that is not specific to any device to the user account. Communications to the other real-time communication address are routed to whatever device the user is logged in to. Also, the user may download a wireless communication application to a computing device to provide access to real-time communications over a telecommunication network that might otherwise be unavailable.

23 Claims, 6 Drawing Sheets

(51) Int. Cl.
  *H04W 12/06* (2009.01)
  *H04L 12/927* (2013.01)
  *H04W 48/08* (2009.01)
  *H04L 29/12* (2006.01)

(52) U.S. Cl.
  CPC ... *H04W 12/0608* (2019.01); *H04W 12/0609* (2019.01); *H04W 48/08* (2013.01); *H04L 61/1547* (2013.01)

(56) References Cited

U.S. PATENT DOCUMENTS

| | | | |
|---|---|---|---|
| 7,128,270 | B2 | 10/2006 | Silverbrook et al. |
| 7,630,986 | B1 | 12/2009 | Herz et al. |
| 7,877,460 | B1 | 1/2011 | Brouwer et al. |
| 8,219,689 | B2 | 7/2012 | Kumar |
| 8,230,461 | B1 | 7/2012 | Ledermann et al. |
| 8,254,549 | B2 | 8/2012 | Bookstall et al. |
| 8,472,608 | B2 | 6/2013 | Bookstall et al. |
| 8,473,743 | B2* | 6/2013 | Freedman ............... H04L 63/02 709/223 |
| 8,923,125 | B2 | 12/2014 | Lott et al. |
| 9,049,269 | B2 | 6/2015 | Ledermann et al. |
| 9,124,699 | B2 | 9/2015 | Youd et al. |
| 9,143,962 | B2 | 9/2015 | Brady et al. |
| 9,204,251 | B1* | 12/2015 | Mendelson ............... G08G 1/14 |
| 9,452,884 | B2 | 9/2016 | Rutledge |
| 9,473,625 | B1* | 10/2016 | Messenger ........... H04W 76/10 |
| 9,569,587 | B2 | 2/2017 | Ansari et al. |
| 9,990,637 | B2 | 6/2018 | Chauhan et al. |
| 2001/0047270 | A1 | 11/2001 | Gusick et al. |
| 2002/0042820 | A1* | 4/2002 | Strom ................. H04L 63/0853 709/219 |
| 2002/0099649 | A1 | 7/2002 | Lee et al. |
| 2002/0136206 | A1 | 9/2002 | Gallant et al. |
| 2002/0188736 | A1* | 12/2002 | Jarvensivu .......... H04L 63/0853 709/229 |
| 2003/0061493 | A1 | 3/2003 | Angelo et al. |
| 2003/0065626 | A1 | 4/2003 | Allen |
| 2004/0107125 | A1 | 6/2004 | Guheen et al. |
| 2005/0049897 | A1 | 3/2005 | Kameda |
| 2006/0210041 | A1 | 9/2006 | Citron et al. |
| 2007/0077966 | A1* | 4/2007 | Huang ................... H04W 12/06 455/558 |
| 2007/0232272 | A1* | 10/2007 | Gonsalves ............... H04W 8/22 455/412.1 |
| 2008/0034406 | A1 | 2/2008 | Ginter et al. |
| 2009/0164639 | A1* | 6/2009 | Sylvain ................. H04L 65/104 709/227 |
| 2009/0175431 | A1 | 7/2009 | Bookstaff et al. |
| 2010/0081460 | A1* | 4/2010 | Knight ................ H04L 12/6418 455/461 |
| 2010/0165845 | A1 | 7/2010 | Lott et al. |
| 2010/0175117 | A1* | 7/2010 | Bumiller ........... H04L 29/12122 726/6 |
| 2011/0119490 | A1 | 5/2011 | Kaal et al. |
| 2011/0145602 | A1 | 6/2011 | Ginter et al. |
| 2011/0231495 | A1* | 9/2011 | Westen ................ G06Q 10/107 709/206 |
| 2013/0089187 | A1 | 4/2013 | Stahl |
| 2013/0244614 | A1* | 9/2013 | Santamaria ............. H04L 51/04 455/411 |
| 2013/0332607 | A1* | 12/2013 | Santamaria ........... G06F 15/173 709/225 |
| 2014/0100885 | A1 | 4/2014 | Stern |
| 2014/0108025 | A1 | 4/2014 | Echeverria Cabrera et al. |
| 2014/0149505 | A1 | 5/2014 | Christiansen |
| 2014/0219167 | A1* | 8/2014 | Santhanam ....... H04W 28/0268 370/328 |
| 2014/0223453 | A1* | 8/2014 | Li .......................... G06F 9/547 719/330 |
| 2014/0235199 | A1* | 8/2014 | Wong .................... H04W 12/06 455/406 |
| 2015/0186895 | A1 | 7/2015 | Chauhan et al. |
| 2015/0188956 | A1* | 7/2015 | Chauhan .............. G06Q 30/016 726/7 |
| 2015/0269536 | A1 | 9/2015 | Parris |
| 2016/0022218 | A1 | 1/2016 | Hayes et al. |
| 2016/0026998 | A1 | 1/2016 | Tanner et al. |
| 2016/0149836 | A1* | 5/2016 | Narayanan .............. H04L 51/04 709/206 |
| 2016/0253274 | A1 | 9/2016 | Huang et al. |
| 2018/0240127 | A1 | 8/2018 | Chauhan et al. |
| 2019/0139055 | A1 | 5/2019 | Chauhan et al. |

OTHER PUBLICATIONS

Office action for U.S. Appl. No. 14/488,979, dated Mar. 3, 2016, Chauhan et al., "Unified Communication Device", 17 pages.
The PCT Search Report and Written Opinion dated Mar. 26, 2015 for PCT application No. PCT/US2014/071133, 15 pgs.
ShoreTel Inc., "ShoreTel Sky Mobility", Dec. 31, 2012, retrieved from http://www.alturacs.com/wordp/wp-content/uploads/resources/Collateral%20-%20ShoreTEl%20Mobility.pdf, pp. 1-2.
Skype Technologies S.A., "Skype Guide for Network Administrators: Skype 3.0 Beta", Oct. 31, 2006, retrieved from http://webcache.googleusercontent.com/search?q=cache:LzieX28FfDEJ:www.oklabs.net//wp-content/uploads/2012/06/guide-for-network-admins-30beta.pdf+&cd=1&hk=ko&ct=clnk&gl=kr, 37 pgs.
Visual Steps B.V., "Using Skype on your iPhone and/or iPad", Aug. 31, 2012, retrieved from http://www.visualsteps.com/assets/review/Guide-Using-Skype-on-your-iPhone-or-iPad.pdf, 38 pages.
The Partial Supplementary European Search Report dated Jul. 11, 2017 for European Patent Application No. 14875734.7, 17 pages.
Office action for U.S. Appl. No. 14/555,447, dated May 24, 2017, Chauhan, "Retail Reinvention and Self Help Care Portal", 12 pages.
The Extended European Search Report dated Oct. 16, 2017 for European Patent Application No. 14875734.7, 14 pages.
Office action for U.S. Appl. No. 14/555,447, dated Oct. 25, 2017, Chauhan, "Retail Reinvention—Home Security WebRTC", 16 pages.
Office Action for U.S. Appl. No. 15/957,455, dated Jun. 15, 2018, Chauhan, "Retail Reinvention and Self Help Care Portal", 13 pages.
The Chinese Office Action dated Oct. 31, 2018 for Chinese patent application No. 201480071057.9, a counterpart foreign application of U.S. Appl. No. 14/574,001.
The Chinese Office Action dated Feb. 26, 2019, for Chinese patent application No. 201480071057.9, a counterpart foreign application of U.S. Appl. No. 14/574,001.
The Englilsh Translation of the Chinese Office Action dated Sep. 4, 2019 for Chinese Patent Application No. 201480071057.9, a counterpart foreign application of the U.S. Appl. No. 14/574,001, 15 pages.
The Chinese Office Action dated Sep. 4, 2019 for Chinese Patent Application No. 201480071057.9 a counterpart of U.S. Appl. No. 14/574,001, x pages.
Office Action for U.S. Appl. No. 16/237,532, dated Oct. 1, 2019, Chauhan, "Retail Reinvention and Self Help Care Portal", 11 pages.
The European Office Action dated Dec. 9, 2019 for European Patent Application No. 14875734.7, a counterpart of U.S. Appl. No. 14/574,001, 9 pages.
Office Action for U.S. Appl. No. 16/237,532, dated Mar. 5, 2020, Chauhan, "Retail Reinvention and Self Help Care Portal", 13 Pages.
The Chinese Office Action dated Jan. 17, 2020 for Chinese Patent Application No. 201480071057.9, a counterpart foreign application of the U.S. Appl. No. 14/574,001, 11 pages.
The Chinese Office Action dated May 21, 2020 for Chinese Patent Application No. 201480071057.9, a counterpart foreign application of the U.S. Appl. No. 14/574,001, 4 pages.

* cited by examiner

US 10,931,721 B2

USER ACCOUNT-BASED ACCESS TO REAL-TIME COMMUNICATIONS

CROSS-REFERENCE TO RELATED APPLICATION

This application is a non-provisional application of, and claims priority to and the benefit of, U.S. Patent Application Ser. No. 61/921,215 filed Dec. 27, 2013 and entitled "WebRTC" the entirety of which is incorporated herein by reference.

BACKGROUND

Traditionally, real-time communication addresses such as phone numbers are tied to specific user devices. These user devices include identity modules, such as subscriber identity modules (SIMs) which are used to authenticate with telecommunication networks to enable real-time communications, such as making and receiving phone calls using the phone number for that user device.

Increasingly, users of services of telecommunication networks have multiple user device and multiple real-time communication addresses. This can necessitate carrying multiple devices, such as a work phone and a home phone. Also, with multiple devices, a user device needed for a specific communication may be lost or forgotten and the user may be unable to engage in that specific communication despite being in the presence of over communication-capable devices.

Further, when user switch provider of telecommunication services, they may be prevented from accessing services of a new telecommunication network by settings of a user device's identity module, resulting in a need for a new user device with a new identity module or for an acquisition of a new real-time communication address.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
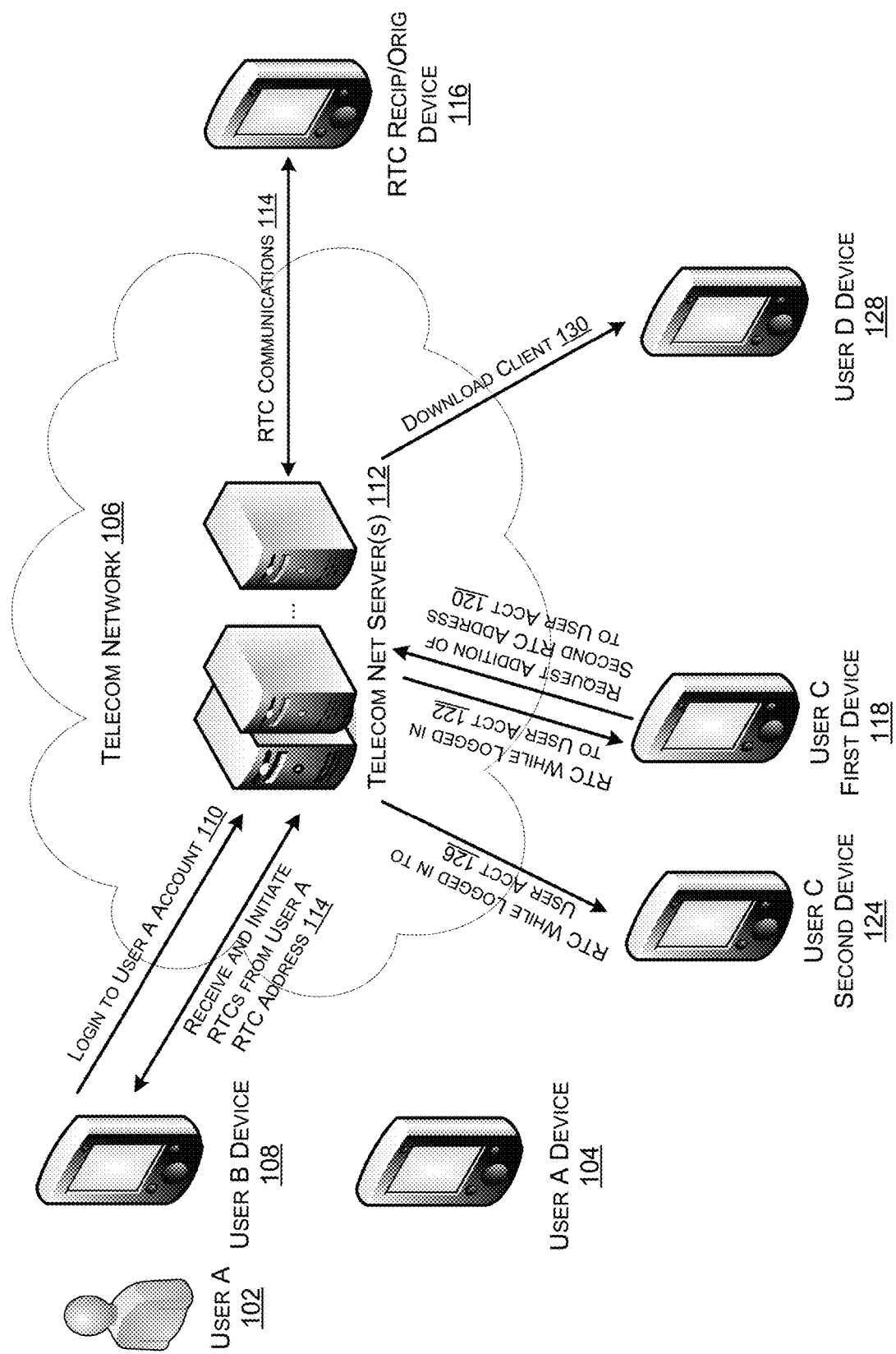
FIG. 1 illustrates an example environment including a telecommunication network and a number of user devices obtaining access to real-time communications from the telecommunication network based on user accounts, as well as extending the real-time communication addresses associated with the user accounts and downloading wireless communication applications to the user devices.

This disclosure describes, in part, providing access to real-time communication (RTC) services associated with RTC addresses based on a user account. A user logging in to a user account on one computing device may be provided with access to RTC services associated with a RTC address even when that RTC address is a RTC address for another device. Once logged in, the user may receive or initiate RTCs for that RTC address at the computing device. The user may also add another RTC address that is not specific to any device to the user account. Communications to the other RTC address are routed to whatever device the user is logged in to. Also, the user may download a wireless communication application to a computing device to provide access to RTCs over a telecommunication network that might otherwise be unavailable.

In various implementations, a user may have a user device that is associated with a specific RTC address. For example, that user device may include an identity module, such as a subscriber identity module (SIM), which stores the RTC address and information for authenticating the user to a telecommunication network. That telecommunication network may also provide a user account for the user which associates user login credentials with one or more RTC addresses, such as the specific RTC address, and one or more devices, such as the user device.

Through the user account, the user may utilize the specific RTC address on other user devices, including both user devices of the user and user devices of other users. These other user device(s) may be equipped with communication client(s), such as web browsers or downloadable clients, that enable the user to log in to the user account and engage in RTC communications while using the specific RTC address. Such a communication client(s) may utilize Web RTC ("WebRTC") stacks or Internet Protocol (IP) Multimedia Subsystem (IMS) stacks of the other user device(s) for the RTC communications.

Server(s) of the telecommunication network which manage the user accounts and route the RTC communications may also enable a user to add an RTC address to a user account. The added RTC address may not be tied to any specific user device and may be used for RTC communications over WiFi or wired IP networks but not for cellular access networks (e.g., networks using licensed spectrum). The user may receive RTCs directed to the added RTC address at a user device when logged in to that user device and may receive RTCs directed to the added RTC address at another user device when logged in to that other user device.

In some implementations, a user may download a communication client, such as a wireless communication application, to a user device to enable the user to use that user device and a RTC address for that user device in RTCs. For example, the user may subscribe to services of a first telecommunication network and be limited to utilizing the RTC address of a user device on that first telecommunication network or other networks through roaming based on credentials stored in the SIM of the user device. Such a user device may be described as being "locked" to the first telecommunication network. If the user desires to utilize that "locked" user device on a second telecommunication network, the user may establish a user account with the second telecommunication network and download a wireless communication application from the second telecommunication network. The user may then utilize the "locked" user device to send and received RTCs over an IP network using the RTC address of the "locked" user device.

Example Environment

FIG. 1 illustrates an example environment including a telecommunication network and a number of user devices obtaining access to real-time communications from the telecommunication network based on user accounts, as well as extending the real-time communication addresses associated with the user accounts and downloading wireless communication applications to the user devices. As illustrated, a user A 102 may have a user device 104 (user A device 104) that is utilized by the user A 102 for RTCs over a telecommunication network 106. For any of a number of reasons, user A 102 may desire to use a different user device 108 (user B device 108) of a different user (user B) for RTCs over a telecommunication network 106. The user A 102 may then have the user B device 108 provide login credentials 110 for a user account of user A to telecommunication network server(s) 112 (server(s) 112) of the telecommunication network 106 and receive an indication that user A 102 is logged in to the user account with user B device 108. The user B device 108 may then receive and enable initiation of RTCs 114 associated with RTC address(es) of the user account. The RTCs may be with a communication participant, such as RTC recipient/originating device 116.

Another user (user C), who may be the same person as user A or user B or may be a different person, may have a user account with the telecommunication network 106 and one or more user devices. Using a first user device 118 (user C first device 118), the user C may send a request 120 for the addition of a second RTC address for that user account to the server(s) 112. The server(s) 112 may add the second RTC address to the user account and the server(s) 112 route RTCs 122 to the user C first device 118 while the user C is logged in to the user C first device 118. Also, when the user C is logged in to a second user device 124 (user C second device 124, the server(s) 112 may route RTCs 126 to the user C second device 124.

Further, another user (user D), who may be the same person as user A, user B, or user C, or may be a different person, may have a user device 128 (user D device 128) and may download 130 a wireless communication application to the user D device 128 from the server(s) 112.

Figure 3:
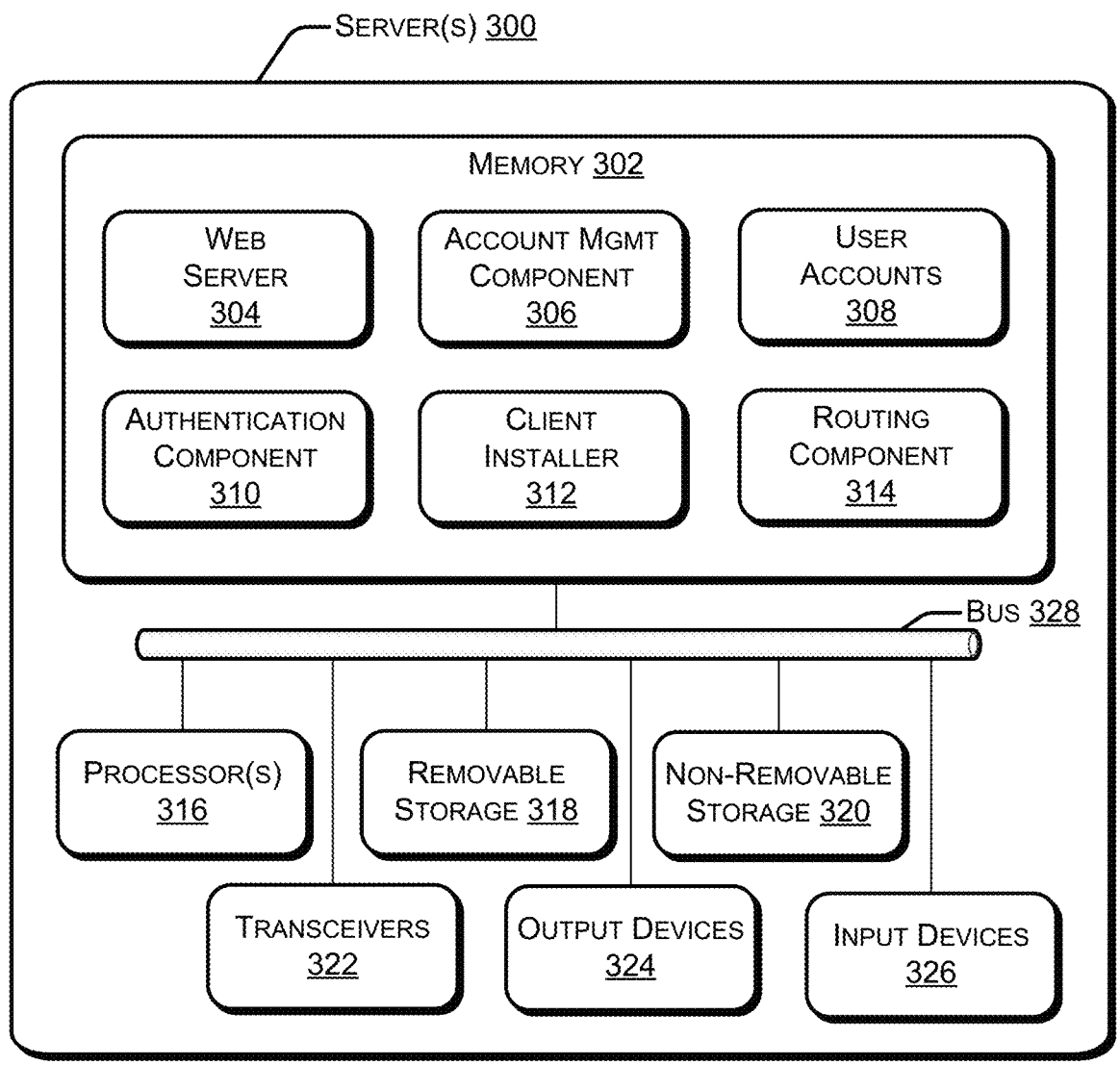
FIG. 3 illustrates a component level view of server(s) of a telecommunication network, the server(s) being configured to manage access to user accounts, provide real-time communication services, and provide downloads of wireless communication applications.

The user A device 104, user B device 108, RTC recipient/originating device 116, user C first device 118, user C second device 124, and user D device 128 (user devices 104, 108, 116, 118, 124, and 128) are all examples of user devices and may each be any sort of user device capable of cellular network, wireless network, or wired network communication, such as a cellular phone, a tablet computer, a personal digital assistant (PDA), a personal computer (PC), a laptop computer, a media center, a work station, a car, a wearable computing device, etc. The user devices 104, 108, 116, 118, 124, and 128 may be different ones of these types of user devices. An example user device 104, 108, 116, 118, 124, or 128 is illustrated in FIG. 3 and described below with reference to that figure.

In some examples, the user devices 104, 108, 116, 118, 124, and 128 may each have a radio and be configured to tune that radio to licensed wireless spectrum utilized by circuit-switched access networks and packet-switched access networks, such as LTE access networks, of the telecommunication network 106. When equipped with a single radio, the UE 106 may be connected to one of these access networks at a time.

The telecommunication network 106 may include one or more access networks, such as the above-mentioned circuit-switched access networks and packet-switched access networks. In addition to access networks utilizing licensed spectrum, the telecommunication network 106 may also include access networks utilizing unlicensed spectrum, such as WiFi or WiMax networks. The telecommunication network 106 may also include a core network, which may include server(s) 112, as well as other components, such as components of a Global System for Mobile Communications (GSM) core network, a Universal Mobile Telecommunications System (UMTS) core network, or a System Architecture Evolution (SAE) core network. The core network may receive messages and RTC communications through access networks of the telecommunication network 106, from public network(s) serving as access networks of the telecommunication network (e.g., wireless or wired IP networks), or from other telecommunication networks.

Further, the server(s) 112 may each be or include a server or server farm, multiple, distributed server farms, a mainframe, a work station, a PC, a laptop computer, a tablet computer, an embedded system, or any other sort of device or devices. In some examples, the server(s) 112 may represent a plurality of computing devices working in communication, such as a cloud computing network of nodes. Example server(s) 112 are illustrated in FIG. 3 and described below with reference to that figure.

In various implementations, user A 102 may have one or more user devices, such as user A device 104, one or more RTC addresses, such as phone numbers, video calling numbers, messaging service numbers, etc., and a user account which associates these devices and addresses with login credentials. While specific RTC addresses may be associated with specific user devices (e.g., through a SIM on a user device or through a mapping by the telecommunication network 106), any of the RTC addresses of the user account may be used on any of the user devices of user A 102 or on any user device of another user equipped with a communication client. As shown in FIG. 1, user A 102 utilizes a user device of another user, user B device 108. This may be because user A device 102 is lost or stolen, because user A 102 is not in a country in which user A device 104 is to be used, or because of any reason whatsoever.

The communication client of the user B device 108 may be downloaded to the user B device 108 by user A 102 from the server(s) 112, or may already be installed on the user B device 108 (e.g., in the case of either a web browser or downloaded application). Once opened and connected to server(s) 112, the communication client may present user A 102 with a user interface for entering login credentials for a user account, such as a user name and password. Upon user entry of the login credentials, the communication client may provide 110 the login credentials to the server(s) 112 and receive, in response, an indication of whether the login was successful.

If login was successful, the server(s) 112 may also provide additional information or user interfaces to the user B device 108, which may be presented in user interface(s) through the communication client to user A 102. This may include a list of RTC addresses associated with the user account, a list of devices associated with the user account, preferences, etc. The user interfaces presented by the communication client may enable user A 102 to select one or more RTC addresses from the list to be RTC addresses. RTCs directed to these selected RTC addresses would then be routed by the server(s) 112 to the user B device 108. Also, the user interfaces presented by the communication client may enable user A 102 to select an RTC address to use for outbound RTCs to identify the user A 102 to RTC recipients, such as RTC recipient device 116. The user interfaces may enable the user A 102 to select different RTC addresses to use for different RTC recipients.

In some implementations, the user interfaces presented by the communication client may enable to manage devices associated with the user account. For example, if user A device 104 is lost or stolen, the user A 102 may report it as lost or stolen, and the server(s) 112 will discontinue telecommunication services, such as sending and receiving RTCs, from the user A device 104.

Further, the user interfaces presented by the communication client may enable to specify preferences for the user account. The user A 102 may specify a preferred device or preferred RTC address as well as quality metrics (e.g., signal strength). For example, one RTC address may be associated with the communication client and another may be associated with a native communication handler of a device, each using a different access network. One RTC address and associated client/handler may be prioritized over another unless a quality metric for the associated access network falls below a threshold. Such preferences may be utilized by server(s) 112 in routing RTCs.

In various implementations, either after the user A 102 has selected RTC address(es), or with use of default RTC address(es), the server(s) 112 may route RTCs 114 to the user B device 108 and from the user B device 108. The user B device 108 may be the originating or terminating device of the RTCs, and the RTC recipient/originating device 116 may be the other communication participant in the RTCs 114. The communication client of the user B device 108 may provide a user interface enabling the user A 102 to answer/accept incoming RTCs 114, initiate outgoing RTCs, and manage ongoing RTCs.

Additionally, the communication client may provide a user interface enabling user A 102 to log out of the user account, which may cause server(s) 112 to discontinue RTCs to and from the user B device 108 that are associated with RTC addresses of the user account. Also, in some implementations, log out from the communication client may cause the communication client to automatically delete itself from the user B device 108.

In further implementations, as shown in FIG. 1, user C has two user devices, user C first device 118 and user C second device 124, and user C may utilize one of these user devices to connect to the server(s) 112 and request 120 addition of a second/additional RTC address to the user account for user C. Such a second RTC address may not be specific to either of the user devices 118 and 124 or to any user device and may, in some examples, only be used for communicating over IP networks, such as WiFi, WiMax, or Ethernet-accessed IP networks. In various examples, the second RTC address may be an RTC address for a different country or jurisdiction than the other RTC addresses associated with the user account. Such an association may avoid significant fees while user C is traveling or living in a different country or may provide a mechanism for a family member of user C in another country to communicate with user C without large fees.

Upon receiving the request 120, the server(s) 112 may add the second RTC address to the user account and may route RTCs 122 and 126 associated with the second RTC address to the respective user devices 118 and 124. The server(s) 112 may route RTC 122 to user C first device 118 while user C is logged in to the user C first device 118. The server(s) 112 may route RTC 122 to user C second device 124 while user C is logged in to the user C first device 124. If user C is logged in to both user devices 118 and 124 at the same time, the server(s) 112 may route a same RTC 122/126 to both user devices 118 and 124, or to one of the two based on user account preferences. If the user has multiple RTC addresses, such as a first RTC address and the second RTC address, RTCs to both of the RTC addresses may be sent to a same user device 118/124 while the user C is logged in to that user device 118/124.

In additional implementations, as shown in FIG. 1, user D has a user D device 128. User D may connect the user D device 128 to server(s) 112 and may download 130 a communication client, such as a wireless communication application, to the user D device 128. In some examples, if the user D device 128 has a native wireless communication application, the download 130 may not be performed or the wireless communication application may not be used.

Upon completion of the download 130, user D may open the wireless communication application to cause it to connect to the server(s) 112 to register with the server(s) 112. Such registration may involve logging in to a user account by, e.g., providing login credentials. Initial registration or any connection of the wireless communication application to the server(s) 112 may involve the wireless communication application providing an emergency address (which may be entered by user D or otherwise obtained), a last known cell identifier, or both.

Figure 2:
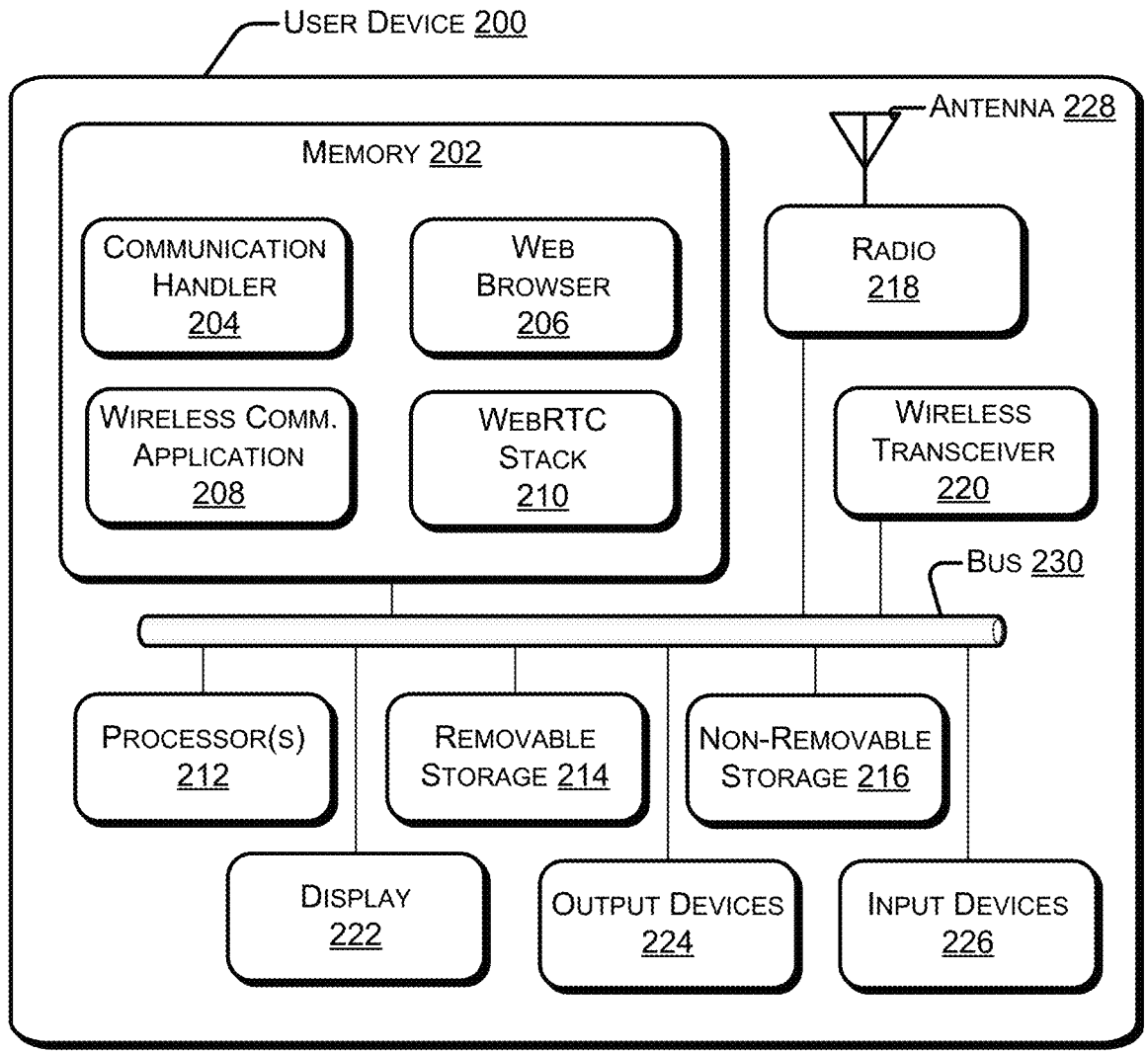
FIG. 2 illustrates a component level view of a user device configured with a communication client to engage in real-time communications over a telecommunication network based on access to a user account.

The wireless communication application may communicate with the server(s) 112 through a WebRTC stack or IMS stack, as discussed in further detail in FIG. 2. Once logged in, the wireless communication application may receive and enable initiation of RTCs. In some examples, the server(s) 112 may route RTCs to either the wireless communication application or to a native communication handler based on preferences or quality metrics. For instance, the communication handler may connect to server(s) 112 over a cellular access network and the wireless communication application may connect to server(s) 112 over a wireless unlicensed access network, and one or the other of the communication handler and the wireless communication application may be selected based on access network preferences or quality metrics (e.g., signal strength).

In some implementations, user D may subscribe to services of a first telecommunication network and be initially limited to utilizing an RTC address of user D device 128 on that first telecommunication network or other networks through roaming based on credentials stored in the SIM of the user D device 128. Such a user device may be described as being "locked" to the first telecommunication network. If user D desires to utilize the "locked" user D device 128 on telecommunication network 106, the user D may establish a user account with telecommunication network 106 and, as described above, download 130 a wireless communication application from the telecommunication network 106. The user D may then utilize the "locked" user D device 128 to send and received RTCs over an IP network using the RTC address of the "locked" user D device 128.

Example Devices

FIG. 2 illustrates a component level view of a user device configured with a communication client to engage in real-time communications over a telecommunication network based on access to a user account. The user device 200 may be any sort of user device, such as one of user devices 104, 108, 116, 118, 124, or 128.

As illustrated, the user device 200 comprises a system memory 202 storing a communication handler 204, a web browser 206, a wireless communication application 208, and a WebRTC stack 210. Also, the user device 200 includes processor(s) 212, a removable storage 214, a non-removable storage 216, radio 218, a wireless communication transceiver 220, a display 222, output device(s) 224, input device(s) 226, and one or more antenna(s) 228 connected to radio 218. Processor 212, radio 218, system memory 202, and other illustrated components of user device 200 can be communicatively coupled via bus 230, e.g., a PCI or other computer bus.

In various examples, system memory 202 is volatile (such as RAM), non-volatile (such as ROM, flash memory, etc.) or some combination of the two. The communication handler 204 stored in the system memory 202 may enable the user device 200 to initiate and receive RTCs, such as voice calls, video calls, and messaging over, e.g., a cellular access network. The communication handler may be an example of the communication clients described further herein. It may present user interfaces, receive user input, and communicate with server(s) 112.

The web browser 206 may be an example of the communication clients described further herein. It may communicate with the server(s) 112 through the WebRTC stack 210 or through other communication stack(s) and may present user interfaces and receive user input. The web browser 206 may communicate with the server(s) 112 over an IP network, such as a wireless or wired network.

The wireless communication application 208 may, as described further herein, be downloaded from server(s) 112. The wireless communication application 208 may be an example of the communication clients also described further herein. It may communicate with the server(s) 112 through the WebRTC stack 210, through an IMS stack, or through other communication stack(s) and may present user interfaces and receive user input. The wireless communication application 208 may communicate with the server(s) 112 over an IP network, such as a wireless or wired network. In some examples, after a logout from a user account, the wireless communication application 208 may be automatically deleted from the user device 200.

The WebRTC stack 210 may enable a web browser 206, wireless communication application 208, or other communication client to communicate with server(s) 112 and engage in RTCs.

In some examples, the processor(s) 212 is a central processing unit (CPU), a graphics processing unit (GPU), or both CPU and GPU, or any other sort of processing unit. Example processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and processors incorporating more than one type of device (e.g., a CPU and an FPGA on a single die).

User device 200 may also include additional data storage devices (removable and/or non-removable) such as, for example, magnetic disks, optical disks, or tape. Such additional storage is illustrated in FIG. 2 by removable storage 214 and non-removable storage 216. Tangible computer-readable media may include volatile and nonvolatile, removable and non-removable media implemented in any method or technology for storage of information, such as computer readable instructions, data structures, program modules, or other data. System memory 202, removable storage 214 and non-removable storage 216 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the user device 200. Any such tangible computer-readable media may be part of the user device 200.

In some examples, the radio 218 includes any sort of radio known in the art. For example, radio 218 may be a radio transceiver that performs the function of transmitting and receiving radio frequency communications. The radio interface may facilitate wireless connectivity between the user device 200 and various cell towers, base stations and/or access points of access networks, e.g., packet-switched or circuit-switched networks.

The wireless communication transceiver 220 may be any sort of component enabling connectivity to wireless access networks, such as a wireless modem or a near field antenna. Such wireless access networks, including WiFi or WiMax access networks, may utilize unlicensed spectrum. The user device 200 may connect to other devices through radio 218 or wireless communication transceiver 220 alternatively or at the same time.

In various examples, the display 222 is a liquid crystal display, organic light-emitting diode (OLED) display, or any other type of display commonly used in telecommunication devices. For example, display 222 may be a touch-sensitive display screen, and can then also act as an input device or keypad, such as for providing a soft-key keyboard, navigation buttons, or the like.

In some examples, the output devices 224 include any sort of output devices known in the art, such as a display (already described as display 222), speakers, a vibrating mechanism, or a tactile feedback mechanism. Output devices 224 also include ports for one or more peripheral devices, such as headphones, peripheral speakers, or a peripheral display.

In various examples, input devices 226 include any sort of input devices known in the art. For example, input devices 226 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 3 illustrates a component level view of server(s) of a telecommunication network, the server(s) being configured to manage access to user accounts, provide real-time communication services, and provide downloads of wireless communication applications. Server(s) 300 may be example(s) of telecommunication network server(s) 112.

As illustrated, the server(s) 300 comprises a system memory 302 storing a web server 304, an account management component 306, user accounts 308, an authentication component 310, a client installer 312, and a routing component 314. Also, the server(s) 300 includes processor(s) 316, a removable storage 318, a non-removable storage 320, transceivers 322, output device(s) 324, and input device(s) 326, any or all of which can be communicatively connected via bus 328.

In various examples, system memory 302 is volatile (such as RAM), non-volatile (such as ROM, flash memory, etc.) or some combination of the two. The web server 304 stored in the system memory 302 may provide user interfaces, such as web pages, to communication clients of user devices, such as web browsers. The web pages may be web pages for submitting information to and receiving information from other components of the server(s) 300, such as the account management component 306, authentication component 310, client installer 312, or routing component 314.

The account management component 306 may enable reading to and writing from user accounts 308. The account management component 306 may receive requests to add RTC addresses to user accounts 308 and may add those RTC addresses to the user accounts 308 based, e.g., on a telecommunication service provider policy or on terms of subscription plans or policies for the users of the user accounts 308. The account management component 306 may also retrieve lists of RTC addresses and user devices and preferences associated with a user account 308 and provide those lists and preferences to a user device either directly a client of the user device or through, e.g., the web server 304 or authentication component 310. Further, the account management component 306 may receive updates to the preferences from the user device either directly from the user device client or through, e.g., the web server 304 or authentication component 310 and may, in turn, update the user accounts 308.

The user accounts 308 may store profiles for users of the telecommunication network. Each profile may include, for example, login credentials (e.g., username and password), a list of RTC addresses, a list of user devices, mappings of ones of the RTC addresses to ones of the devices, and preferences.

The authentication component 310 may receive login credentials from a user device through, e.g., the web server 304 or directly from a client of the user device and may authenticate the login credentials based at least on the user accounts 308. The authentication component 310 may then send an indication to the user device through, e.g., the web server 304 or directly to the user device client indicating whether the login was successful. In some implementations, the authentication component 310 may then invoke the account management component 306 to cause the account management component 306 to provide lists of RTC addresses, devices and preferences to the user device, either directly to the user device client, through the web server, or through the authentication component 310. In further implementations, the authentication component 310 may receive indication of a logout either directly from a user device client or through, e.g., the web server 304 and may, in turn, invoke the routing component 314 to cause the routing component 314 to stop routing RTCs to and from the user device. The authentication component 310 may also invoke the client installer 312 responsive to the logout to cause the client installer 312 to uninstall a wireless communication application.

The client installer 312 may receive a request through, e.g., the web server 304 of a user device for a wireless communication application. In response, the client installer 312 may install the wireless communication application on that user device. In some examples, the client installer 312 may be invoked by the authentication component 310 upon a logout from a user account to uninstall the wireless communication application from the user device.

The routing component 314 may be invoked by the authentication component 310 and may receive RTC addresses and devices from the account management component 306, a user device, or both. The routing component 314 then routes RTCs to or from the user device either directly through a client of the user device or through, e.g., web server 304 until receiving an indication from, for instance, the authentication component 310 to discontinue doing so. Such an indication may be provided responsive to a logout. In some implementations, the routing component 314 may also retrieve preferences from the account management component 306 and utilize the preferences in routing RTCs to user devices and to specific handlers or applications on those devices. Such preference-based routing decisions may also involve quality metrics for access networks which the routing component 314 may obtain from other telecommunication network devices or components.

In some examples, the processor(s) 316 is a central processing unit (CPU), a graphics processing unit (GPU), or both CPU and GPU, or any other sort of processing unit described above with reference to processor 316.

The server(s) 300 also includes additional data storage devices (removable and/or non-removable) such as, for example, magnetic disks, optical disks, or tape. Such additional storage is illustrated in FIG. 3 by removable storage 318 and non-removable storage 320. System memory 302, removable storage 318 and non-removable storage 320 are all examples of computer-readable storage media. Tangible computer-readable media and computer-readable storage media can be as discussed above with reference to removable storage 318 and non-removable storage 320.

In some examples, the transceivers 322 include any sort of transceivers known in the art. For example, transceivers 322 may include a radio transceiver that performs the function of transmitting and receiving radio frequency communications. Also, or instead, the transceivers 322 may include other wireless or wired connectors, such as Ethernet connectors, wireless modems, or near-field antennas. The transceivers 322 may enable the server(s) 300 to communication with other devices of a telecommunication network or with devices outside of the telecommunication network.

In some examples, the output devices 324 include any sort of output devices known in the art, such as a display, speakers, a vibrating mechanism, or a tactile feedback mechanism. Output devices 324 also include ports for one or more peripheral devices, such as headphones, peripheral speakers, or a peripheral display.

In various examples, input devices 326 include any sort of input devices known in the art. For example, input devices 326 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 4:
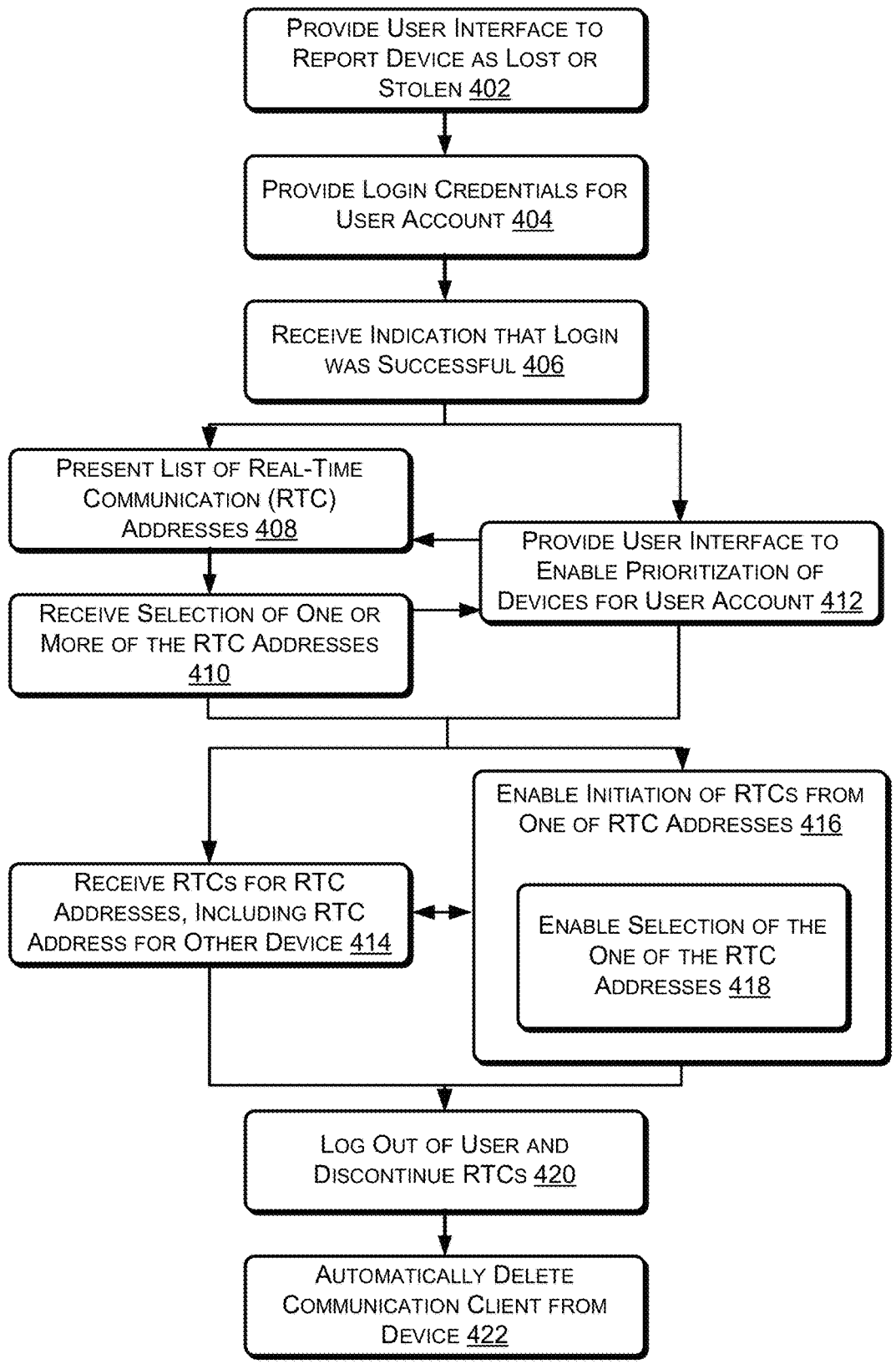
FIG. 4 illustrates an example process for a user device to log in to a user account, receive real-time communications directed to one or more real-time communications associated with the user account, and enable initiation of a real-time communication from one of the real-time communication addresses.
Figure 5:
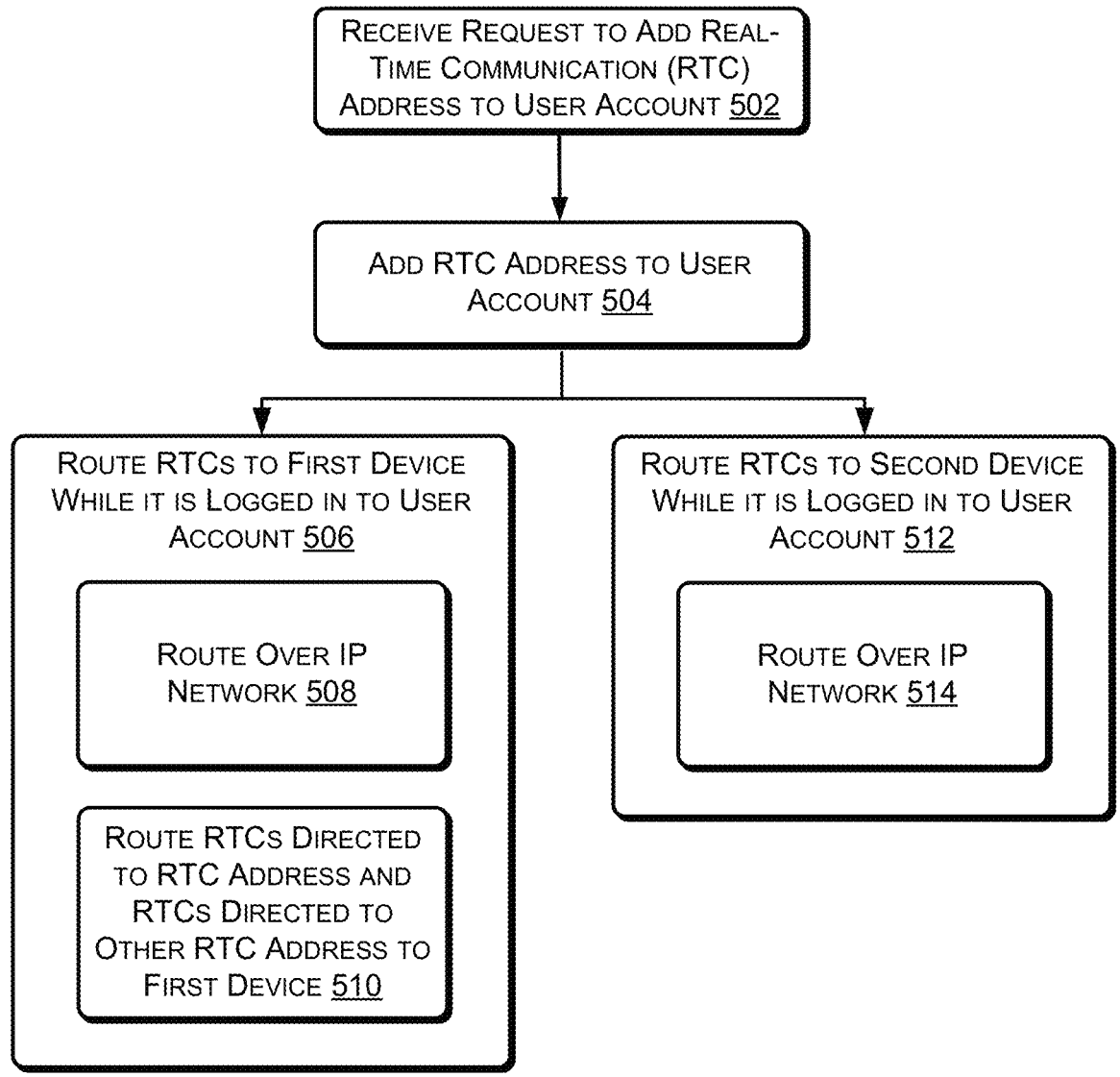
FIG. 5 illustrates an example process for server(s) of a telecommunication network to add a real-time communication address to a user account and to route communications for the real-time communication address to one or more different user devices while those user devices are logged in to the user account.
Figure 6:
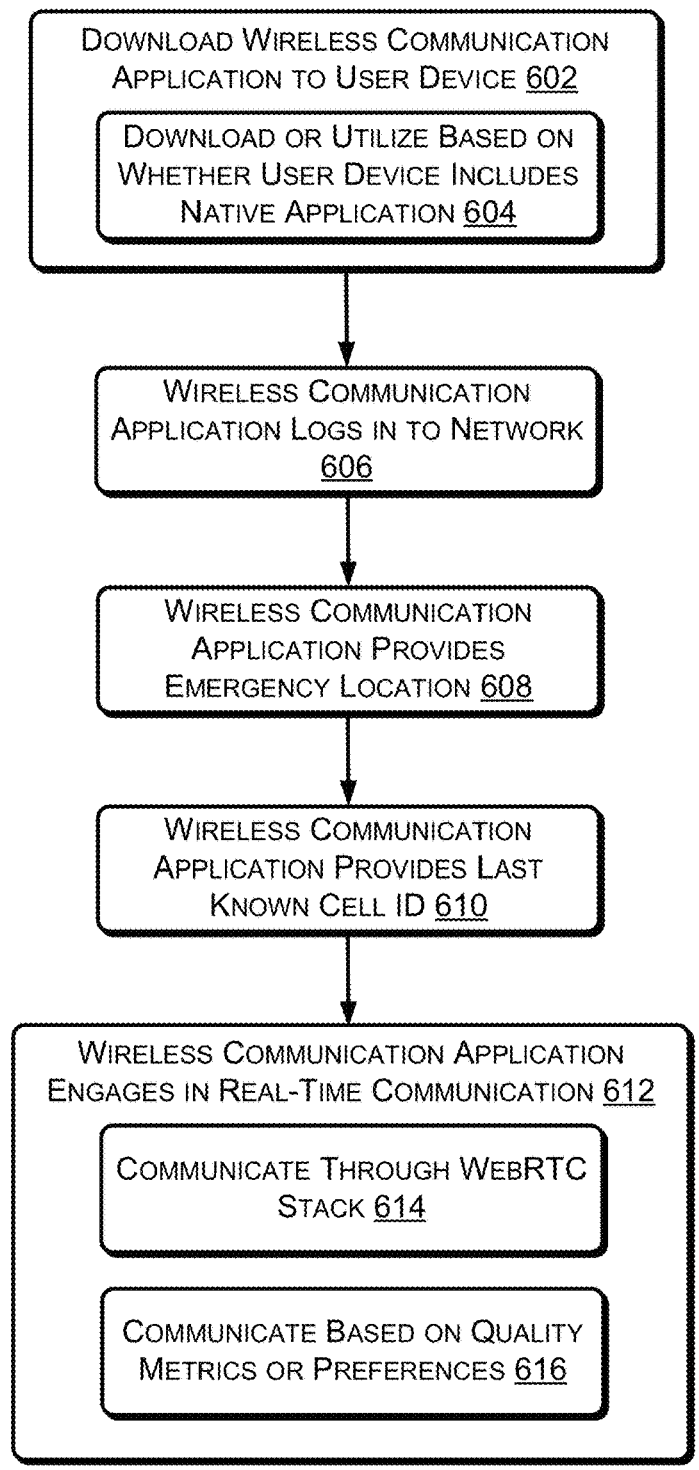
FIG. 6 illustrates an example process for a user device to download a wireless communication application, log in to a user account with the wireless communication application, and engage in real-time communications with the wireless communication application.

FIGS. 4-6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for a user device to log in to a user account, receive real-time communications directed to one or more real-time communications associated with the user account, and enable initiation of a real-time communication from one of the real-time communication addresses. The process includes, at 402, providing a user interface to a user that enables a user of a computing device to report another device as lost or stolen. The computing device may be a phone, a tablet computer, a personal computer, a car, a media player, or a wearable computing device.

At 404, the computing device may provide, through a communication client of the computing device, login credentials for a user account of a telecommunication service provider to an authentication component of the telecommunication service provider. Such credential may be entered by the user through a user interface of the communication client. At 406, in response, the communication client of the computing device may receive an indication that login to the user account was successful. The communication client may be any sort of communication client, such as a web browser or a downloadable application.

At 408, as part of the login of afterward, the computing device may present a user interface including a list of real-time communication addresses associated with the user account. The list may be received from the authentication component or from another component of the telecommunication service provider. The list may also include, for example, a real-time communication address that is associated by the telecommunication service provider with another device, such as the device reported lost or stolen. At 410, the computing device may then receive, through the user interface presenting the list (or through another user interface), a selection of the one or more real-time communication addresses from the list of real-time communication addresses.

At 412, either before or after the operations shown at blocks 408 and 410, the computing device may provide a user interface that enables the user of the computing device to prioritize among devices associated with the user account and the one or more real-time communication addresses. For example, the user interface may enable the user to prioritize based on at least one of preferences for devices or real-time communication addresses or signal strengths of connections available to the devices.

At 414, in response to receiving the indication at 406, the computing device may receive real-time communications directed to one or more real-time communication addresses associated with the user account through the communication client. The one or more real-time communication addresses may the real-time communication addresses selected by the user at 410.

At 416, either bring, during, or after the receiving at 414, the computing device may enable, through the communication client, initiation of a real-time communication to a communication recipient from one of the one or more real-time communication addresses. At 418, this may include enabling a user of the computing device to select the one of the one or more real-time communication addresses.

At 420, the computing device may log out of the user account, and, in response, discontinue the receiving and the enabling. At 422, the computing device may then, in response to the logging out, automatically delete the communication client from the computing device.

FIG. 5 illustrates an example process for server(s) of a telecommunication network to add a real-time communication address to a user account and to route communications for the real-time communication address to one or more different user devices while those user devices are logged in to the user account. The process includes, at 502, receiving, by an account management component of one or more servers of a telecommunication service provider, a request associated with a user account of the telecommunication service provider. The request may be received from a web browser or downloadable application. The user account may be associated by the telecommunication service provider with a first real-time communication address and the request may be a request to add a second real-time communication address to the user account. Also, the first real-time communication address may be a primary address of a different user device which includes an identity module for authenticating to a telecommunication network of the telecommunication service provider. Further, the first real-time communication address and the second real-time communication address may be real-time communication addresses for different countries.

At 504, the account management component of the one or more servers of the telecommunication service provider may add the second real-time communication address to the user account.

At 506, while a first device is logged in to the user account, a routing component of the one or more servers of the telecommunication service provider may route real-time communications directed to the second real-time communication address to the first device. At 508, the routing may include routing over an IP access network. At 510, the routing may include routing both real-time communications directed to the second real-time communication address and real-time communications directed to the first real-time communication address to the first device while the first device is logged in to the user account.

At 512, while second first device is logged in to the user account, the routing component of the one or more servers of the telecommunication service provider may route real-time communications directed to the second real-time communication address to the second device. At 514, the routing may include routing over an IP access network. When the first device and second device are logged into the user account at a same time, the routing component of the one or more servers of the telecommunication service provider may route to the first device and second device at the same time.

FIG. 6 illustrates an example process for a user device to download a wireless communication application, log in to a user account with the wireless communication application, and engage in real-time communications with the wireless communication application. The process includes, at 602, downloading a wireless communication application to a user device. The wireless communication application may be downloaded from server(s) of a telecommunication network. At 604, the user device may download or utilize the wireless communication application based on whether the user device includes a native wireless communication application.

At 606, prior to engaging in real-time communication, the wireless communication application may log in to a user account associated with a telecommunication service provider which provides real-time communications over a telecommunication network.

At 608, prior to engaging in real-time communication, the wireless communication application may provide an emergency address to the telecommunication network.

At 610, the wireless communication application may provide a last known cell identifier during registration with unlicensed access network of the telecommunication network.

At 612, the wireless communication application engages in real-time communications over the telecommunication network via the unlicensed access network. At 614, this may include communicating through a WebRTC stack of the user device. At 616, this may include communicating based on preferences or quality metrics. Also, the wireless communication application may utilize a real-time communication address for real-time communication over the unlicensed access network while being prevented from using the real-time communication address for real-time communication over the cellular access network because of credentials in an identity module of the user device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   reporting, to one or more servers of a telecommunication network via a user interface accessible via a computing device, that a second computing device has been lost or stolen, wherein the telecommunication network primarily associates a real-time communication (RTC) address with the second computing device based on the RTC address being stored in a subscriber identity module (SIM) of the second computing device and the RTC address not being stored in a second SIM of the computing device;
   providing, by a communication client executing on the computing device to an authentication component of the one or more servers of the telecommunication network, login credentials for a user account of the telecommunication network maintained by the one or more servers, wherein the user account includes profile data stored at the one or more servers including the login credentials and indicators of one or more RTC addresses associated with the user account, the one or more RTC addresses including the RTC address that the telecommunication network primarily associates with the second computing device;
   receiving, by the communication client, an indication that the authentication component validated the login credentials and has associated the user account with the computing device; and
   responsive to receiving the indication,
   enabling, through the communication client of the computing device, receipt of an incoming real-time communication routed by the one or more servers of the telecommunication network, the incoming real-time communication being addressed to the RTC address that the telecommunication network primarily associates with the second computing device, and
   enabling, through the communication client of the computing device, initiation of an outgoing real-time communication routed by the one or more servers of the telecommunication network to a communication recipient, the outgoing real-time communication being addressed from the RTC address that the telecommunication network primarily associates with the second computing device.

2. The method of claim 1, wherein the communication client is a web browser or a downloadable application.

3. The method of claim 1, further comprising:
   presenting, by the communication client, a list of the one or more RTC addresses associated with the user account; and
   receiving, by the communication client, a selection, from the list, of the RTC address that the telecommunication network primarily associates with the second computing device,
   wherein the selection enables the communication client on the computing device to receive the incoming real-time communication addressed to the RTC address that the telecommunication network primarily associates with the second computing device and/or to initiate the outgoing real-time communication addressed from the RTC address that the telecommunication network primarily associates with the second computing device.

4. The method of claim 1, wherein the computing device is a phone, a tablet computer, a personal computer, a car, a media player, or a wearable computing device.

5. The method of claim 1, further comprising logging out of the user account through the communication client, and, in response, disabling the receipt of the incoming real-time communication and disabling the initiation of the outgoing real-time communication, and wherein the logging out causes the one or more servers to disassociate the computing device with the user account.

6. The method of claim 5, further comprising, in response to the logging out, automatically deleting the communication client from the computing device.

7. The method of claim 1, further comprising providing, by the communication client, user-selectable options that enable a user of the computing device to prioritize among the computing device and one or more other devices associated with the user account and between the one or more RTC addresses associated with the user account.

8. The method of claim 7, wherein the user-selectable options enable the user to prioritize based on at least one of preferences or signal strength.

9. The method of claim 1, wherein enabling initiation of the outgoing real-time communication to the communication recipient from the RTC address that the telecommunication network primarily associates with the second computing device comprises enabling a user of the computing device to select the RTC address from a list of the one or more RTC addresses associated with the user account.

10. The method of claim 1, wherein the communication client is a communication handler configured to communicate with the one or more servers via a cellular access network.

11. The method of claim 2, wherein the web browser or the downloadable application is configured to communicate with the one or more servers via an Internet Protocol (IP) network.

12. The method of claim 11, wherein the web browser or the downloadable application is configured to communicate with the one or more servers through a WebRTC stack or an IP Multimedia Subsystem (IMS) stack.

13. A method comprising:
- maintaining, by one or more servers of a telecommunication network, a user account that includes profile data including login credentials and one or more real-time communication (RTC) addresses associated with the user account, the one or more RTC addresses including at least a first RTC address primarily associated by the telecommunication network with a user device, based on the first RTC address being stored in a subscriber identity module (SIM) of the user device;
- receiving, by an account management component of the one or more servers, a request to add a second RTC address to the user account, the request including the login credentials;
- adding, by the account management component, the second RTC address to the user account upon validation of the login credentials by the account management component;
- routing, by a routing component of the one or more servers of the telecommunication network, real-time communications directed to the first RTC address and to the second RTC to a first device, based on the first device being logged in to the user account; and
- routing, by the routing component, the real-time communications directed to the second RTC address to a second device, based on the second device being logged in to the user account.

14. The method of claim 13, wherein the routing to the first device and the routing to the second device comprises routing over an Internet Protocol access network.

15. The method of claim 13, wherein the first device and second device are logged into the user account at a same time, and the routing to the first device and the routing to the second device occurs at the same time.

16. The method of claim 13, wherein the request is received from a web browser or downloadable application of the first device or the second device.

17. The method of claim 13, wherein the first RTC address and the second RTC address are real-time communication addresses for different countries.

18. A user device comprising:
- a processor;
- a radio for communicating on licensed spectrum;
- a wireless transceiver for communicating on unlicensed spectrum;
- a communication handler configured to be operated by the processor to engage in real-time communication with a cellular access network via the radio solely over the licensed spectrum; and
- a wireless communication application downloaded to the user device and configured to be operated by the processor to communicate with an unlicensed access network via the wireless transceiver solely over the unlicensed spectrum,
- wherein the communication handler and the wireless communication application use a same real-time communication address for sending and receiving messages and the user device utilizes one of the communication handler and the wireless communication application as selected by a routing component of a telecommunication network based on at least one of user device preferences or quality metrics for the cellular access network or the unlicensed access network when sending a first message sent from the real-time communication address or when receiving a second message sent to the real-time communication address, and
- wherein the real-time communication address is associated by a telecommunication service provider with a different device for sending and receiving messages on that different device and is stored in a subscriber identity module of the different device.

19. The user device of claim 18, wherein the wireless communication application is not downloaded or is inoperative if the user device includes a native wireless communication application.

20. The user device of claim 18, wherein the wireless communication application requires a login to a user account and an entry of an emergency address prior to use of wireless communication application for real-time communication.

21. The user device of claim 18, wherein the wireless communication application transmits a last known cell identifier during registration with unlicensed access network.

22. The user device of claim 18, wherein the wireless communication application utilizes a real-time communication address for real-time communication over the unlicensed access network while being prevented from using the real-time communication address for real-time communication over the cellular access network because of credentials in an identity module of the user device.

23. The user device of claim 18, further comprising a Web Real-Time Communication (WebRTC) stack that is utilized by the communication handler and the wireless communication application for real-time communications.

* * * * *